United States Patent [19]

Berdanos

[11] Patent Number: 4,719,530
[45] Date of Patent: Jan. 12, 1988

[54] LIGHTNING PROTECTION SYSTEM FOR A REMOTE CONTROL CIRCUIT UTILIZING AN ISOLATION TRANSFORMER

[76] Inventor: Guy Berdanos, 25, avenue de Romans, 38360 Sassenage, France

[21] Appl. No.: 562,597

[22] PCT Filed: Mar. 21, 1983

[86] PCT No.: PCT/FR83/00054
§ 371 Date: Nov. 21, 1983
§ 102(e) Date: Nov. 21, 1983

[87] PCT Pub. No.: WO83/03500
PCT Pub. Date: Oct. 13, 1983

[30] Foreign Application Priority Data

Mar. 22, 1982 [FR] France .................. 82 05053

[51] Int. Cl.$^4$ ............................. H02H 7/22
[52] U.S. Cl. ....................... 361/66; 361/68; 361/91
[58] Field of Search .......... 361/64, 66, 68, 91, 361/88; 336/96, 205; 561/111, 117

[56] References Cited

U.S. PATENT DOCUMENTS

| 1,489,369 | 4/1924 | Steinberger | 336/96 X |
|---|---|---|---|
| 2,075,709 | 3/1937 | Fallou | 361/68 |
| 2,137,865 | 11/1938 | Traver | 361/66 |
| 2,222,729 | 11/1940 | Ver Planck et al. | 336/96 |
| 2,806,184 | 9/1957 | Carter | 361/66 |
| 2,925,570 | 2/1960 | Strock | 336/96 |
| 3,082,389 | 3/1963 | Settles et al. | 336/96 X |
| 3,222,625 | 12/1965 | Ledocg | 336/96 X |
| 3,678,339 | 7/1972 | Sun et al. | 361/68 X |
| 4,009,419 | 3/1977 | Ligman | 361/91 |
| 4,071,873 | 1/1978 | Andow et al. | 361/66 X |
| 4,205,360 | 5/1980 | Drucker | 361/64 X |
| 4,228,476 | 10/1980 | Okita et al. | 361/68 |
| 4,234,901 | 11/1980 | Strickland, Jr. | 361/64 |
| 4,322,768 | 3/1982 | Maeda et al. | 361/64 |
| 4,371,908 | 2/1983 | Andow et al. | 361/68 X |
| 4,427,900 | 1/1984 | Aumont et al. | 361/66 X |
| 4,528,611 | 7/1985 | Udren | 361/68 X |

FOREIGN PATENT DOCUMENTS

| 2386175 | 10/1978 | France . | |
| 2393454 | 12/1978 | France . | |
| 0074259 | 7/1978 | Japan | 361/68 |

*Primary Examiner*—Philip H. Leung
*Assistant Examiner*—A. Jonathan Wysocki
*Attorney, Agent, or Firm*—Dennison, Meserole, Pollack & Scheiner

[57] ABSTRACT

An insulated device for protection of over-voltage, particularly due to lightning discharge and used in binary information transmission systems. The system includes a transmitter and a receiver, each including a high insulation transformer supplied by an oscillator and included in a cylindrical block of insulating synthetic resin. A normal transmission line connects the receiver and transmitter.

3 Claims, 6 Drawing Figures

LIGHTNING PROTECTION SYSTEM FOR A REMOTE CONTROL CIRCUIT UTILIZING AN ISOLATION TRANSFORMER

BACKGROUND OF THE INVENTION

The present invention relates to protective systems against overvoltage for devices for the transmission of binary data through electric lines.

In these devices, the data is conveyed at the sending or receiving end by the opening or closing of a relay. Because the associated installations are then connected to the line, their operation may be seriously damaged if the voltage in said line changes suddenly.

If lightning strikes any point on the line, or even if it strikes nearby, it causes an overvoltage wave which propagates from the point of impact to the two extremities. The connected installations in turn can be affected by this overvoltage and severe damage may be caused.

For this type of installation, ground contacts can be adapted to ensure discharge of the current. This protection remains inadequate, owing to the impedance that these ground contacts always present. When lightning strikes only one of the installations, this may cause a momentary voltage surge in the installation. A voltage differential is then produced between the line and the installation.

To avoid these drawbacks, it is proposed to develop a binary data transmission system using an electric line wherein the tramsitter and the receiver are both sufficiently insulated with respect to the line and to the installations to withstand voltages up to 100,000 volts. Under such conditions, the voltage of the line is immaterial. It may be grounded or not.

SUMMARY OF THE INVENTION

The present invention overcomes the problems in the prior art and provides an insulated device to protect against over-voltage in binary information transmission systems. The new device includes a transmitter as well as a receiver and each including a high insulation transformer that is supplied by an oscillator, the entire assembly being provided in a cylindrical block of insulating synthetic resin. It will be understood that a normal transmission line connects the receiver and transmitter.

DESCRIPTION OF THE PREFERRED EMBODIMENT

Figure 1:
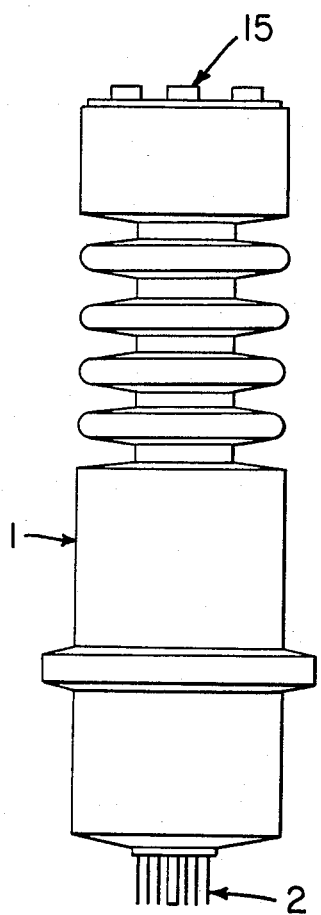
FIG. 1 is a front elevation of my improved device for a transmitter.
Figure 2:
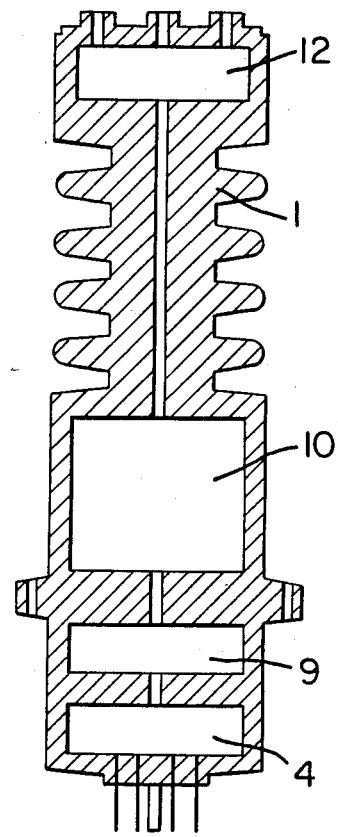
FIG. 2 is a vertical section taken through the device of FIG. 1.
Figure 3:
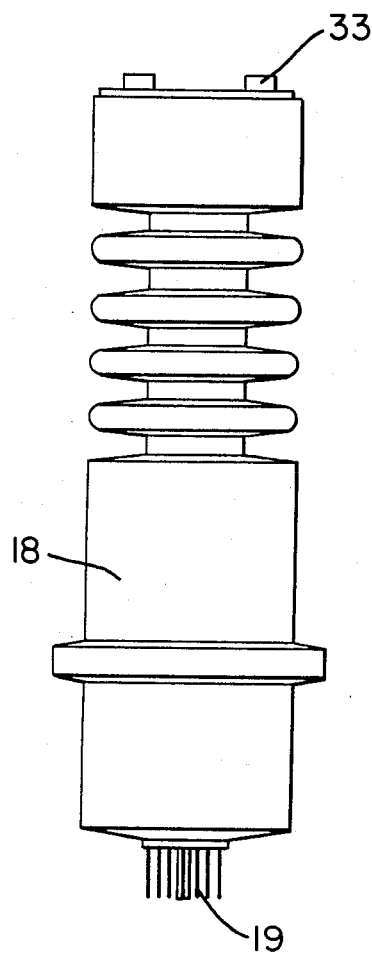
FIG. 3 is a front elevation of my improved device for a receiver.
Figure 4:
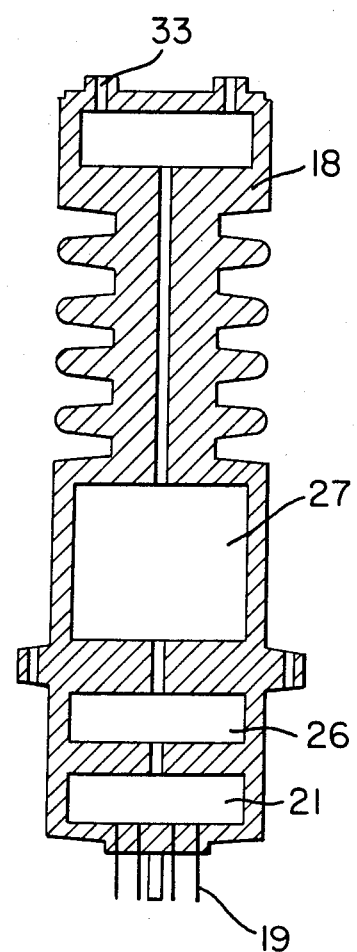
FIG. 4 is a vertical section through the device of FIG. 3.
Figure 5:
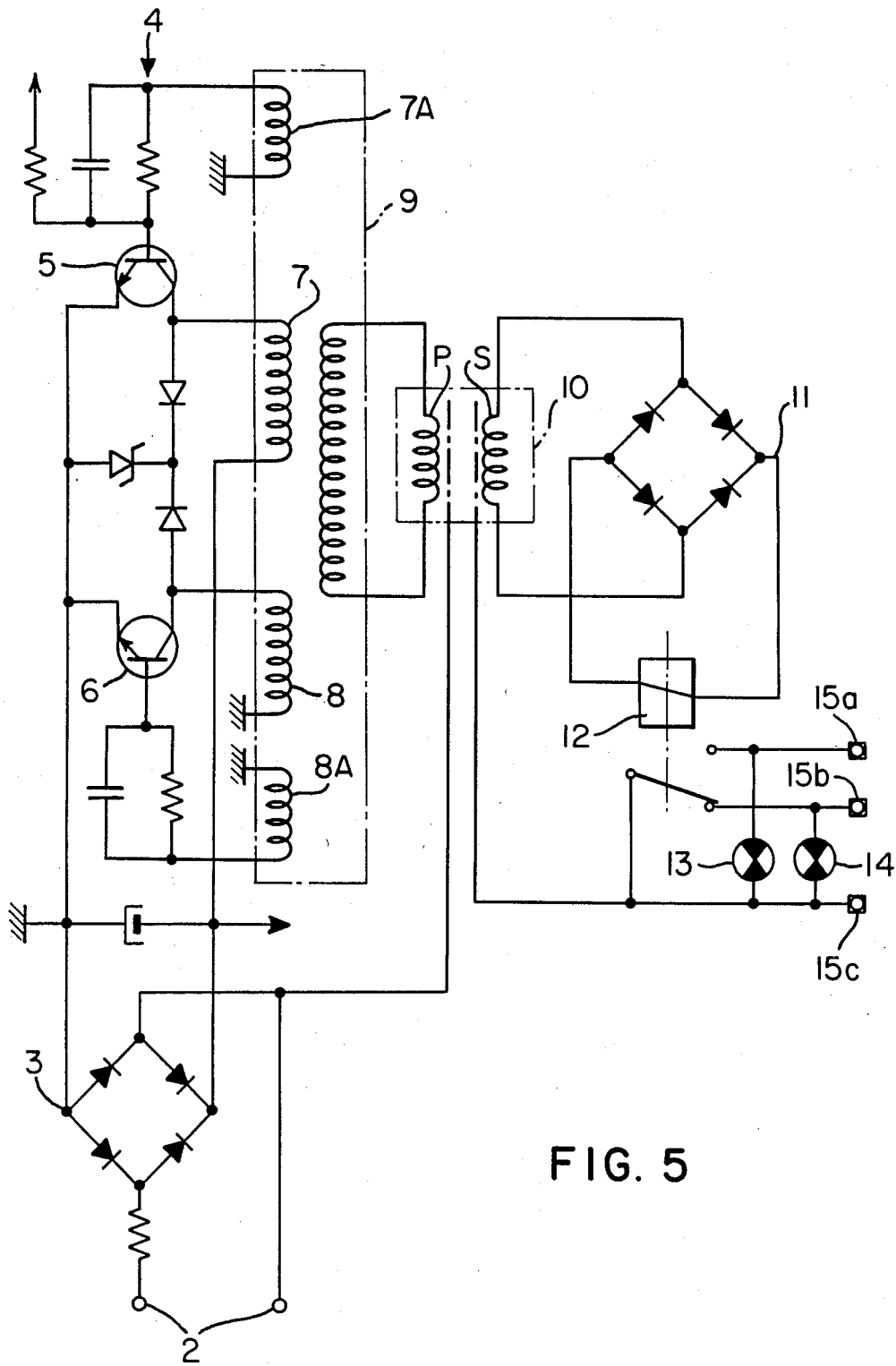
FIG. 5 is circuit schematic for the transmitter.
Figure 6:
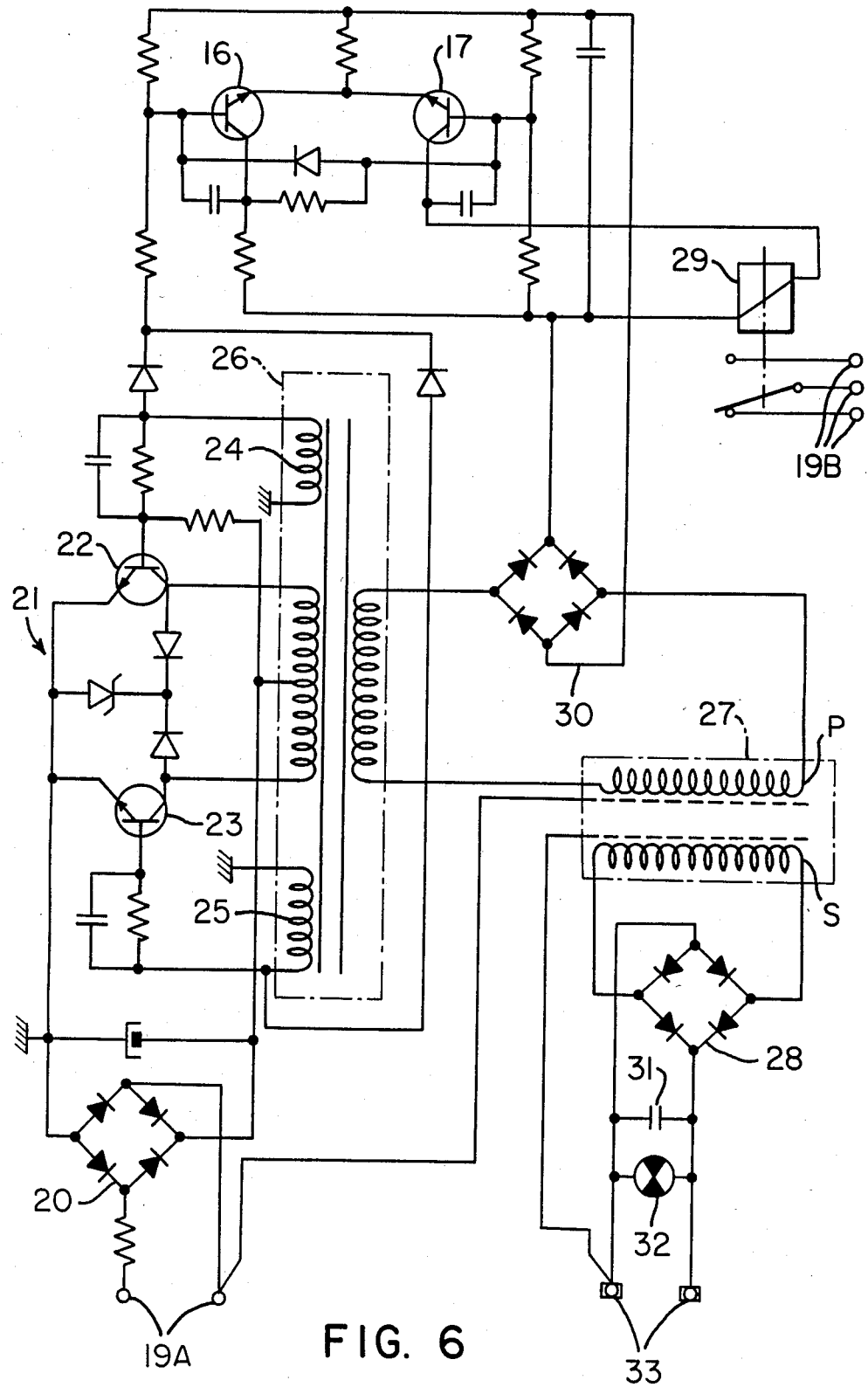
FIG. 6 is circuit schematic for the receiver.

In the transmitter, the presence of a current of a normal voltage of 24 or 48 volts, rectified by diodes 3, if it is alternating, at the input 2 of the transmitter, triggers the operation of an oscillator 4 composed of transistors 5 and 6, and of the coils 7, 8 and 8A of transformer 9. This oscillator provides an alternating voltage of 20 kH frequency which supplies the high insulation transformer 10, having a primary and a secondary.

The rectifier bridge 11 produces direct current from the alternating current present at the secondary of transformer 10. This direct current activates relay 12 whose contact, protected by spark arresters 13 and 14, causes the opening or the short-circuiting of the line.

The transmitter is insulated by the use of ferrite, the insulating characteristics of which are known for the construction of the magnetic circuit of a transformer. On the other hand, the entire transmitter is included in a cylindrical block made of synthetic insulating resin, and the material used in the preferred embodiment of the invention is epoxy resin.

The risk of creepage of the current along the insulator between the input terminals 2 and the output terminals 15A, B, and C is avoided by the length of the cylinder which is longer than the creepage distance, and the wires corresponding to the outputs of transformer 10 are provided accordingly.

Finally, the exterior of the cylinder is provided with grooves designed to extend the path of creepage of the current.

In another embodiment of the invention, an open circuit transformer may be used.

In that case, the magnetic circuit of transformer 10 is replaced by a ferrite rod on which the primary circuit is coiled. This rod is then placed in an insulating well—a simple hollow cylinder sealed at one of its ends and made of insulating resin which is filled with resin, sealing the other end. The secondary circuit is then coiled around the cylinder, concentrically with the primary circuit.

The available current at the output of the secondary circuit in this embodiment is not sufficient to activate relay 12.

The alternating voltage present at the terminals of the secondary circuit would thus have to be rectified by a diode and a capacitor to saturate the base of a transistor of which the impedance then becomes very weak. Similarly, the oscillator may be replaced by a sinusoidal generator.

Receiver 18 is similar to the transmitter in its appearance and in most of its elements. It comprises an oscillator 21 composed of transistors 22 and 23 and coils 24 and 25, permanently supplied with power under a voltage of 24 or 48 volts, rectified if necessary by diodes 20 and a transformer 26, identical with transformer 9. The insulating transformer 27 is similar to transformer 10 in its conception, but not in its operation.

The input 33 of the receiver, connected to rectifier 28, is protected by the lightning spark arrester 32. Rectifier 28 is connected to the outputs of the seconday circuit S of transformer 27.

The alternating current present at the outputs of transformer 26 is applied to a circuit which, in a series configuration, comprises the primary circuit of transformer 27, rectifier bridge 30 and a threshold detection circuit composed of transistors 16 and 17, which are to control relay 29.

When the secondary circuit of transformer 27 is open, the impedance of the primary circuit P is sufficiently high to limit the current at the terminals of the threshold circuit. Relay 29 thus is not energized.

The short-circuiting of the transmission line causes the closing of the secondary circuit of transformer 27. The impedance of its primary circuit then decreases sufficiently so that the energy furnished by this circuit can activate relay 29. The data transmitted is available at the terminals 19B of this relay.

Rectifier bridge 28 and capacitor 31 are for the purpose of preventing the parasite capacity of the line from short-circuiting the secondary circuit of transformer 27, and also preventing any disturbance to other installations which might be caused by the electro-magentic radiation of the line.

The entire receiver is insulated using the same procedures as for the transmitter.

Transformer 27 may be modified in the same manner as transformer 10 of the transmitter.

The oscillator of the receiver may also be replaced by a sinusoidal signal generator.

The device thus developed is particularly suited for the protection of telecontrol equipment, in particular for the overhead cableways or cablecars, which cannot be stopped during operation, and which consequently can be struck by lightning during their operation, with all the dangers of destruction of the control installations that this implies.

The use of the transmitter and the receiver, object of the invention, at the connecting points of the lines and the departure and arrival stations, will make it possible to safeguard all these installations in case the line or a station is struck by lightning.

Other uses are possible, in particular, protection of ionic accelerators.

I claim:

1. A remote control system having a sending station and a remote receiving station connected by a signal transmission line subject to overvoltage induced by lightning strikes; said control system including on On—Off signal input means (2), sending oscillator means (4) for converting an input signal into an oscillation in a sending oscillator transformer (9), said sending oscillator transformer (9) including means coupling said sending oscillator transformer to a sending isolation transformer (10) having a high insulation breakdown voltage and a low coupling capacity between the sending isolation transformer windings, said isolation transformer (10) being coupled to a sending rectifier (11), a sending relay (12) coupled to said sending rectifier and including contacts movable between controlling positions, the contacts of said sending relay arranged to control the switching state of said signal transmission line (15a–15c), said remotely located receiving station being connected to said signal transmission line at a signal input terminal (33), said receiving station including continuously energized power input means (19A), receiving oscillator means (21) for converting the power input into an oscillation in a receiving oscillator transformer (26), said receiving oscillator transformer being coupled to a receiving isolation transformer (27) having a primary and a secondary winding similar to said sending isolation transformer (10), a threshold detection circuit (16, 17) coupled to said receiving primary winding of said receiving isolation transformer, a load relay )29), said load relay controlled by said threshold detection circuit, said secondary winding of said receiving isolation transformer (27) being coupled to said signal transmission line whereby short circuiting of said signal transmission line at said sending relay contacts increases current flow in the secondary and primary windings of said receiving isolation transformer (27) to activate said threshold detector and energize said load relay (29) while opening said sending relay contacts and reducing current flow in said secondary and primary windings of said receiving isolation transformer to deactivate the threshold detector and deenergize said load relay.

2. A system as in claim 1 wherein a lightning induced overvoltage entering said sending station is blocked by said isolation transformer (10) and damped without damage to said sending station.

3. A system as in claim 1 wherein a lightning induced overvoltage entering said receiving station is blocked by said isolation transformer (27) and damped without damage to said receiving station.

* * * * *